US011703220B2

(12) United States Patent
Champagne

(10) Patent No.: US 11,703,220 B2
(45) Date of Patent: Jul. 18, 2023

(54) PORTABLE ELECTRIC LIQUID FUEL VAPORIZER

(71) Applicant: Eric Champagne, Windsor (CA)

(72) Inventor: Eric Champagne, Windsor (CA)

( * ) Notice: Subject to any disclaimer, the term of this patent is extended or adjusted under 35 U.S.C. 154(b) by 0 days.

(21) Appl. No.: 17/748,114

(22) Filed: May 19, 2022

(65) Prior Publication Data

US 2022/0275937 A1 Sep. 1, 2022

Related U.S. Application Data

(63) Continuation of application No. 16/400,689, filed on May 1, 2019, now Pat. No. 11,339,965.

(51) Int. Cl.
*F23K 5/22* (2006.01)
*F17C 7/04* (2006.01)

(52) U.S. Cl.
CPC .................. *F23K 5/22* (2013.01); *F17C 7/04* (2013.01); *F17C 2221/035* (2013.01); *F17C 2227/0393* (2013.01); *F23K 2300/205* (2020.05); *F23K 2300/206* (2020.05)

(58) Field of Classification Search
CPC ................. F23K 5/22; F23K 2300/206; F23K 2300/205; F17C 7/04; F17C 2221/035; F17C 2227/0393; F24H 1/186; F24H 1/208; B01J 2219/00074
USPC ......... 122/17.1, 17.2, 18.1, 14.1, 14.2, 15.1, 122/31.1, 234
See application file for complete search history.

(56) References Cited

U.S. PATENT DOCUMENTS 7,097,210 B2 * 8/2006 Rolph ..................... F16L 39/00 285/252
7,694,894 B2 * 4/2010 Warren .................. B05B 7/166 239/128

* cited by examiner

*Primary Examiner* — Justin M Jonaitis

(57) ABSTRACT

A portable vaporizer for heating a liquid-phase fuel. The vaporizer comprising a reservoir having a least one wall for containing a heat-conducting fluid within the reservoir. A heating tube extending into the reservoir such that the heating tube is in fluid contact with the heat-conducting fluid. The heating core has and inlet through which the liquid-phase fuel will flow and an outlet through which the vaporized liquid-phase fuel will flow. A heating core comprising an electric heating element placed within the reservoir to heat the heat-conducting fluid and vaporize the liquid-phase fuel passing through the heating tube.

16 Claims, 8 Drawing Sheets

PORTABLE ELECTRIC LIQUID FUEL VAPORIZER

CROSS-REFERENCE

The present Utility patent application is a continuation of U.S. Utility patent application Ser. No. 16/400,689 filed on May 1, 2019, entitled "PORTABLE LIQUID FUEL VAPORIZER", which claims priority to U.S. Provisional Patent Application No. 62/665,470, entitled "PORTABLE LIQUID FUEL VAPORIZER", filed May 1, 2018, the contents of these applications are incorporated herein by reference.

TECHNICAL FIELD

The present invention relates to a portable vaporizer. In particular, the present invention relates to a portable electric vaporizer for vaporizing liquid propane to gaseous propane to be used in a portable torch especially during cold temperatures.

BACKGROUND

Many gas-operated tools require an ample amount of gas under a certain pressure to function properly. One such tool is a portable propane torch used to produce a flame at the end of the torch and apply heat to a surface. The necessary pressure required will be determined by the heat output requirements of the torch for a specified use.

The pressure of the gaseous propane within a tank is a function of the ambient temperature surrounding the tank. Therefore, when the ambient temperature drops below a certain temperature, the pressure of the gas within the tank will be insufficient to provide the torch with the necessary amount of gas to produce the necessary heat.

Using liquid propane can reduce the inconveniences of using gaseous propane because liquid propane vaporizes at approximately −45 Fahrenheit whereas gaseous propane at −45 Fahrenheit will provide little pressure. Conventional liquid vaporizers are meant to be stationary and installed within a controlled environment and thus are not adapted to be portable or used over a large range of ambient temperatures.

Therefore, there is a need for a portable device which can vaporize liquid-phase fuels to be used under ambient conditions.

SUMMARY OF THE INVENTION

One aspect of the present implementation includes a vaporizer for heating a liquid-phase fuel, the vaporizer comprising a reservoir having a least one wall for containing a liquid; a heat-conducting fluid within the reservoir; a heating core, the heating core extending into the reservoir such that the heating core is in fluid contact with the heat-conducting fluid, the heating core having and inlet end through which liquid-phase fuel will flow and an outlet end through which gaseous fuel will flow; an electric heating element within the reservoir, the electric heating element being in contact with the heat-conducting fluid to increase the temperature of the heat-conducting fluid to a predetermined temperature, the predetermined temperature being such that the liquid phase fuel entering the heating core will at least partially vaporize before exiting the heating core.

Another aspect of the present implementation is the heating core further comprises a thin-walled tube between the inlet end and the outlet end, the thin-walled tube having a first internal diameter with the inlet end fluidly connected to a liquid-phase fuel source and the outlet end fluidly connected to a utility tool.

Yet another aspect of the present implementation is the thin-walled tube of the heating core extends into the reservoir in the shape of a spiral.

In another aspect of the present implementation, the heating core surrounds at least a portion of the electric heating element which is in contact with the heat-conducting fluid.

In another aspect of the present implementation, the heating core further comprises a flange connected to the reservoir, the first and second ends of the heating core connected to the flange such that the liquid-phase fuel passes through the flange into the heating core.

In yet another aspect of the present implementation, the heating core flange further comprises an aperture through which the heat-conducting fluid is poured into the reservoir.

Another aspect of the present implementation has the heating core removably fixed to the reservoir.

In yet another aspect of the present implementation the electric heating element further comprises a first part within the reservoir and a second part outside the reservoir.

In yet another aspect of the present implementation the second part of the reservoir further comprises a flexible power cord with a connector.

In yet another aspect of the present implementation the vaporizer further comprises a handle for carrying the vaporizer.

In yet another aspect of the present implementation the vaporizer comprises a temperature sensor in contact with the heat-conducting fluid.

Another aspect of the present implementation includes a temperature gauge, the temperature gauge indicating the temperature of the heat-conducting fluid measured by the temperature sensor.

Another aspect of the present implementation includes a controller, the controller operatively connected to the electric heating element to control the electric heating element according to the temperature sensed by the temperature sensor.

In yet another aspect of the present implementation the vaporizer comprises a controller further comprises a manual selector, the manual selector having a plurality of settings, each setting representing a different temperature for the heat-conducting fluid.

In yet another aspect of the present implementation the vaporizer the temperature sensed by the temperature sensor corresponds to the temperature set by the manual selector, the controller controls the electric heating element to at least reduce the temperature of the heat-conducting fluid.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Although the present technology is described below with respect to a utility torch using a portable liquid propane vaporizer it is contemplated that aspects of the present technology could be applied to vaporize other natural liquid fuels to supply other tools including, but not limited to boilers and grills.

Figure 1:
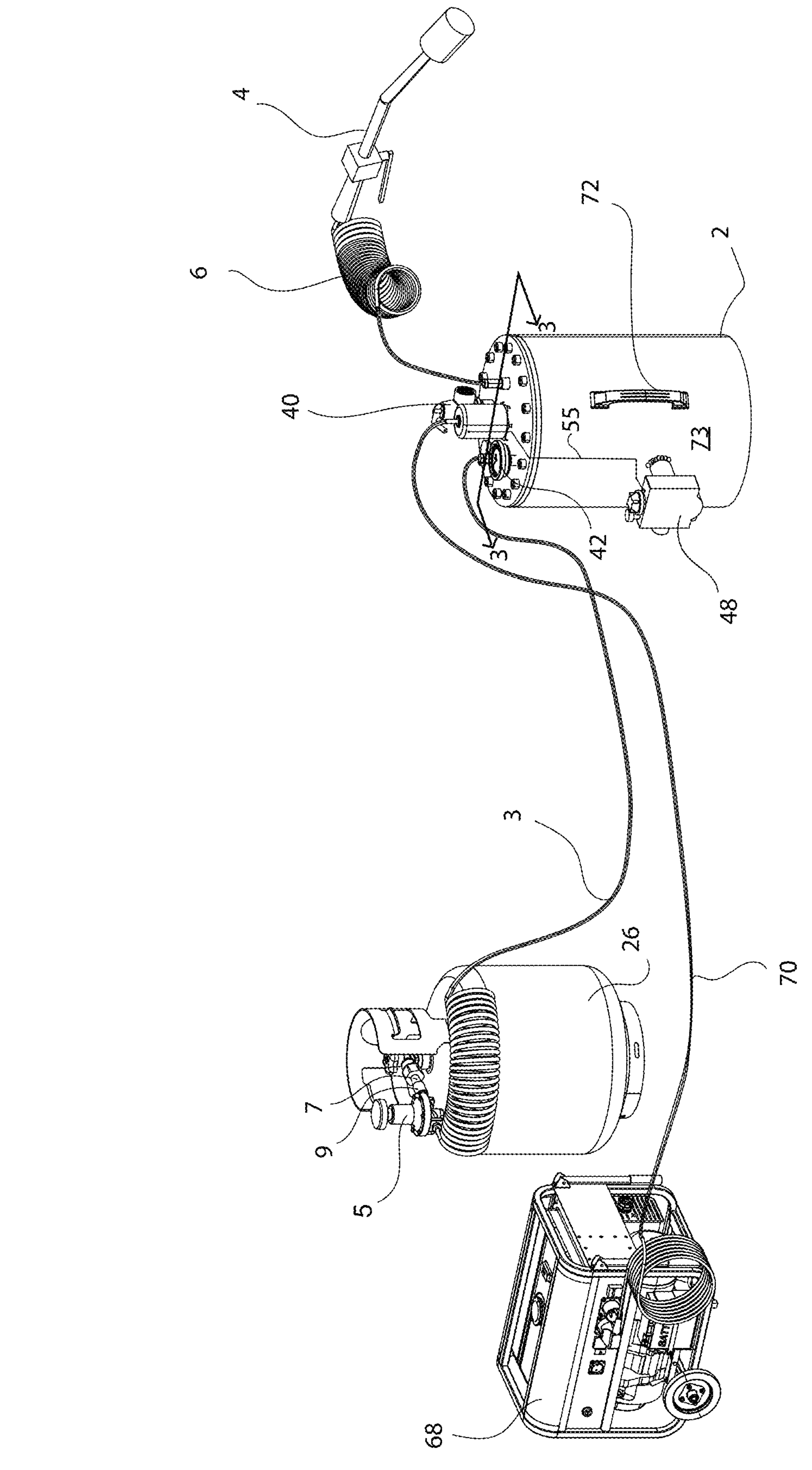
FIG. 1 is a front plan view of the vaporizer of the present implementation.

With reference to FIG. 1, a vaporizer 2 is connected to one or more tools such as utility torch 4 via hose 6. To supply liquid-phase fuel to vaporizer 2, a tank 26 of the liquid-phase fuel is connected to the vaporizer 2 via flexible hose 3. A regulator 5 regulates the pressure of the liquid-phase fuel from the tank 26 to obtain the desired pressure for which the vaporizer 2 is designed. In the present implementation, regulator 5 will regulate the pressure between 40 PSI (Pounds per Square Inch) to 100 PSI to correspond to the operating pressure of the utility torch 4. To prevent any reverse flow of liquid or gaseous phase fuel toward the tank 26, a one-way valve or check valve 7 can be added to the hose 3. Valve 7 could be placed upstream or downstream of the regulator 5. Downstream from valve 7 is a security valve 9. Security valve 9 ensures that pressure within the hose 3 does not exceed a predetermined value. The predetermined value could be a function of one of the components of the vaporizer 2 such as hose 6 or reservoir 8 for example. In the present implementation, security valve 9 is set to open and expel liquid or gaseous fuel within the hose 3 to the atmosphere when the pressure reaches 150 PSI, but other limits are contemplated. It is contemplated that the order of the regulator 5, check valve 7 and security valve 9 along hose 3 could be other than that shown in FIG. 1.

Figure 2:
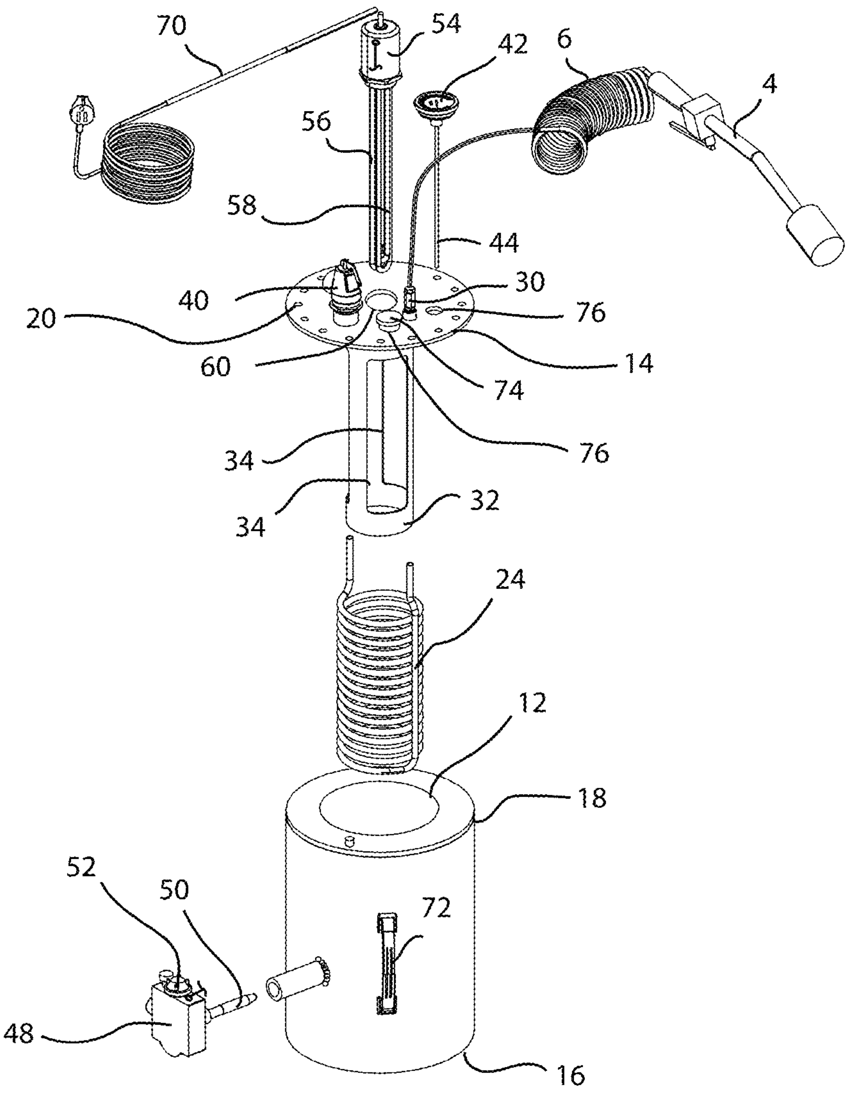
FIG. 2 is an exploded view of the vaporizer of FIG. 1.
Figure 3:
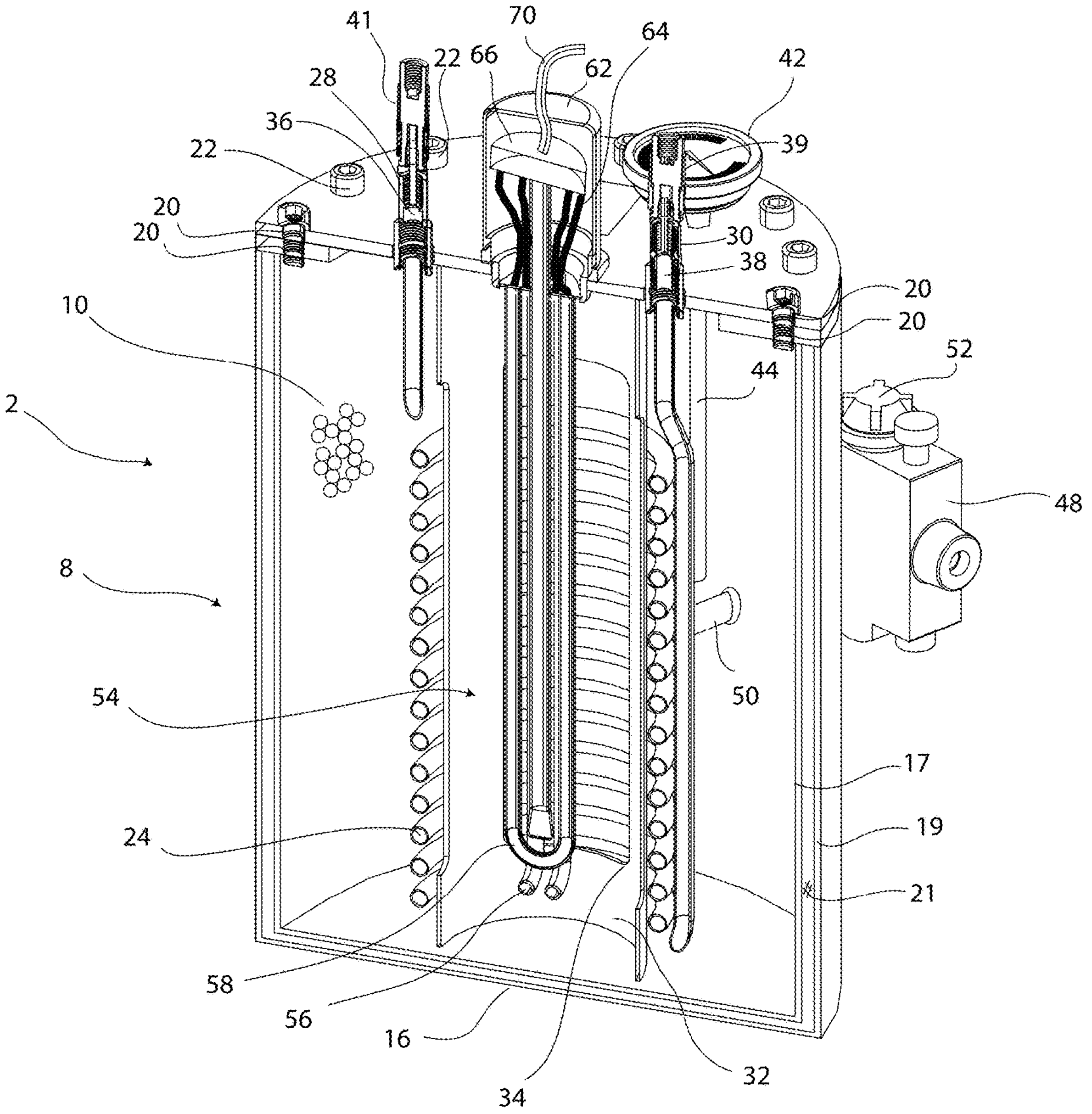
FIG. 3 is a cross section of the vaporizer of FIG. 1 taken along line 3-3.

With reference to FIGS. 2 and 3, vaporizer 2 includes reservoir 8 for containing a heat-conducting fluid 10 or the like. In the present implementation, reservoir 8 has a cylindrical external shape of approximately 8 to 10 inches in diameter and approximately 20 to 24 inches in height with an internal volume of approximately 3 to 5 gallons. While these dimensions were chosen so reservoir 8 could by easily transportable, it is contemplated that other dimensions and shapes could be chosen which keep vaporizer easily transportable. Reservoir 8 has a closed end 16 and an open end 18. Open end 18 further includes an opening 12 which is smaller in diameter than the inner diameter of reservoir 8 to create a shoulder to which flange 14 is sealed to prevent the heat-conducting fluid 10 from leaking from the reservoir 8 when transporting the vaporizer 2. It is contemplated that a rubber or other type of seal could be placed between reservoir 8 and flange 14 to further prevent leakage. Flange 14 and open end 18 of reservoir 8 have a plurality through holes 20 which receive fasteners 22 for mating flange 14 to reservoir 8. In the present implementation, it is contemplated that holes 20 in the reservoir could be threaded to accept fasteners 22 but it is contemplated that flange 14 could be welded to reservoir 8. While the present implementation of reservoir 8 is a metallic cylindrical structure, it is contemplated that reservoir 8 could be made from any suitable material having a different shape or size that is convenient for a lightweight and portable vaporizer.

Reservoir 8 is filled with a heat-conducting fluid 10 such as water or a water and Propylene glycol mixture. It is contemplated that any material suitable for transferring heat could be used such as liquids, gels, fibers and the like. As mentioned above, in the present implementation, reservoir 8 is filled with approximately 3 to 5 gallons of a 50-50 mixture of water and propylene glycol which is suitable for transporting and using the vaporizer in ambient temperatures below the freezing temperature of water.

To increase the efficiency of vaporizer 2, reservoir 8 has a double walled structure including inner wall 17 and outer wall 19 with an insulation material 21 therebetween. Insulation material 21 helps reduce heat loss from the heat-conducting fluid 10 through the reservoir walls when being operated in freezing temperatures.

With reference to FIGS. 2 and 3, a heating tube 24 is show within the reservoir 8. Heating tube 24 is fluidly connected to the tank 26 to receive the liquid-phase fuel therein. To removably connect heating tube 24 to reservoir 8, heating tube 24 is connected to flange 14 through connectors 28 and 30. In the present implementation, heating tube 24 is removable from reservoir 8 in the event heating tube 24 requires inspection and or maintenance.

An inner core 32 extends from flange 14 and provides support for the spiral-shaped heating tube 24. Inner core 32 includes several apertures 34 such that the water-glycol mixture 10 can easily flow around the heating tube 24 and heating core 54 as will be explained in further details below. In the present implementation, inner core 32 is hollow and cylindrical in cross section, it is contemplated that the inner core 32 could be any suitable cross section or even omitted in the case heating tube 24 does not need supporting.

Heating tube 24 is constructed of a thin-walled tube, preferably of a material which efficiently allows the heat from the water-glycol mixture to pass therethrough into the liquid-phase fuel passing within. Metals such as steel and aluminum are suitable, but others are contemplated.

Heating tube 24 has an inlet end 36 passing through flange 14 through which the liquid-phase fuel enters the heating tube. Heating tube 24 extends into reservoir 8 by spiraling around the inner core 32 then returns toward flange 14 to an outlet 38 which passes through flange 14. It is contemplated that heating tube 24 could be installed within reservoir 8 in other forms than a spiral. The length of heating tube 24 will be determined by the heat transfer necessary for the liquid-phase fuel to be vaporized into a gaseous fuel. A person skilled in the art would recognize that the ratings of, amongst others, the heating liquid, the material as well as the size and shape of the heating core and heating tube will all influence the amount of liquid-phase fuel which can be effectively vaporized through vaporizer 2. Such a person skilled in the art would recognize which materials to use and in which portions in order obtain desired results.

Best seen in FIGS. 2 and 3, flange 14 is fixed to reservoir 8 via several fasteners 22 such that the liquid-phase fuel inlet end 36 extends outside the reservoir 8 to be connected to tank 26 via the hose 3 and regulator 5. Gaseous fuel outlet 38 is also shown extending outside reservoir 8 connecting to a flexible hose 6 via a quick connector 39. Similarly, flexible hose 3 is connected to the vaporizer 2 using a second quick connector 41. Quick connectors 39 and 41 enable the user to easily and quickly disconnect hoses 3 and 6 from the vaporizer 2 to improve the portability of vaporizer 2 when transporting vaporizer 2 to from different locations. One example of quick connectors is the RBE series quick connectors from Stäubli Systems.

Best shown in FIG. 3, a second security valve 40 is sealingly inserted through flange 14. Security valve 40 is calibrated to open when the pressure or temperature within reservoir 8 exceeds a predetermined amount. In the present implementation, valve 40 is set to open at a pressure of 150 psi or a water-glycol temperature of 210 degrees Fahrenheit.

To visually see the temperature of the water-glycol mixture 10 while using the vaporizer 2, a dial-type temperature gauge 42 is installed to reservoir 8. The temperature gauge 42 has a probe 44 that extends within the reservoir 8 and in contact with the water-glycol mixture 10. In the present implementation, probe 44 passes through an opening 46 within flange 14 and is sealed such that no liquids will escape. It is contemplated that temperature gauge 42 could be installed elsewhere on reservoir 8. It is also contemplated that a digital gauge could be used thus probe 44 and the digital gauge could be provided at different places for convenience. A mixture filling opening 74 also passes through the flange 14 and is sealed closed with a cap 76. Opening 74 enables mixture 10 to be added to or removed from the reservoir 8.

A controller 48 is installed on the side of the reservoir 8. Controller 48 includes a probe 50 passing through reservoir 8 to be in contact with the mixture 10. Controller 48 also includes a dial 52 which allows the user to determine at what temperature the mixture 10 is to be maintained. Controller 48 further includes an internal temperature sensor (not shown) connected with probe 50 which is used to control the temperature of the mixture 10.

To provide heat to the mixture 10, a heating core 54 extends into reservoir 8 in contact with the mixture 10. In the present implementation, heating core 54 includes a first heating element 56 and a second heating element 58 but it is contemplated that one or more than two heating elements could be used. Heating core 54 passes through an opening 60 in flange 14 to extend heating elements 56, 58 into reservoir 8. It is contemplated that heating core 54 could be threaded into opening 60 and sealed to prevent the mixture 10 from leaking around the heating core 54. Heating core 54 includes a housing 62 which seals wires 64 and a controller 66. Heating core 54 is controlled, via an electric wire 55, via controller 48 to control the temperature at which the heating core 54 maintains the mixture 10. Like controller 48, controller 66 can also control the temperature of the mixture 10 to a desired temperature either alone or in combination with controller 48. It is contemplated that controller 66 can be set to control the mixture 10 to a predetermined temperature or be connected to controller 48 to control the temperature of the mixture 10 to that set by dial 52.

Heating core 54 is electrically connected to a source of electricity such as a portable generator 68 or a standard household 120 v or 240 v power outlet. Generator 68 could be one of many types of portable generators that are commercially available and will not be described in further detail. Due to its portable nature, the heating core 54 of vaporizer 2 includes a length of flexible power cord 70 having an electric plug 71 at its free end, that will allow the user to freely circulate a predetermined distance with the vaporizer 2 without having to continuously displace the generator 68 or disconnect and reconnect to different power outlets. Similarly, flexible hose 3, which connects the vaporizer 2 to the tank 26, would also have a length comparable to that of power cord 70 to not have to continuously displace tank 26 with vaporizer 2. Because of the portability of the vaporizer 2, tank 26 and generator 68, it is contemplated that all three could be fixed to a wheeled buggy and easily transported around the worksite all together. It is contemplated that electric plug 71 is a standard 2 or 3-pronged plug used in standard commercially-available portable generators and wall outlets configured for the country in which the vaporizer will be used.

Best shown in FIGS. 1 and 3, vaporizer 2 includes one or more handles 72 to easily transport vaporizer 2. It is contemplated that vaporizer 2 could be carried with one hand of the user while the other hand operates torch 4 to easily and quickly make repairs in different areas of the worksite. It is also contemplated that vaporizer 2 could be equipped with a set of wheels so vaporizer 2 can be easily rolled around a worksite when the terrain allows for such. Best shown in Figure's 1 and 2, handle 72 is placed along one side of the vaporizer 2 that does not have any connectors such as quick connectors 39 and 41. This provides for less interference with the user's hand while carrying the vaporizer 2. In this particular implementation, handle 72 is placed on the cylindrical surface 73 between ends 16 and 18. As such, when placing vaporizer 2 on a surface, the user may either lay the vaporizer on surface 73 opposite the handle 72 or on closed end 18, either will be convenient for the user.

The present implementation of vaporizer 2 also places quick connectors 39, 41 and handle 72 so that is possible to transport vaporizer 2 and not have the connectors 39 or 41 between the vaporizer 2 and the person carrying the vaporizer. As best seen in FIGS. 1 and 2, quick connectors 39 and 41 are placed on vaporizer 2 such that they are in-line with handle 72 therefore quick connectors 39 and 41 are either in front of the user or behind the user while carrying the vaporizer.

Figure 4:
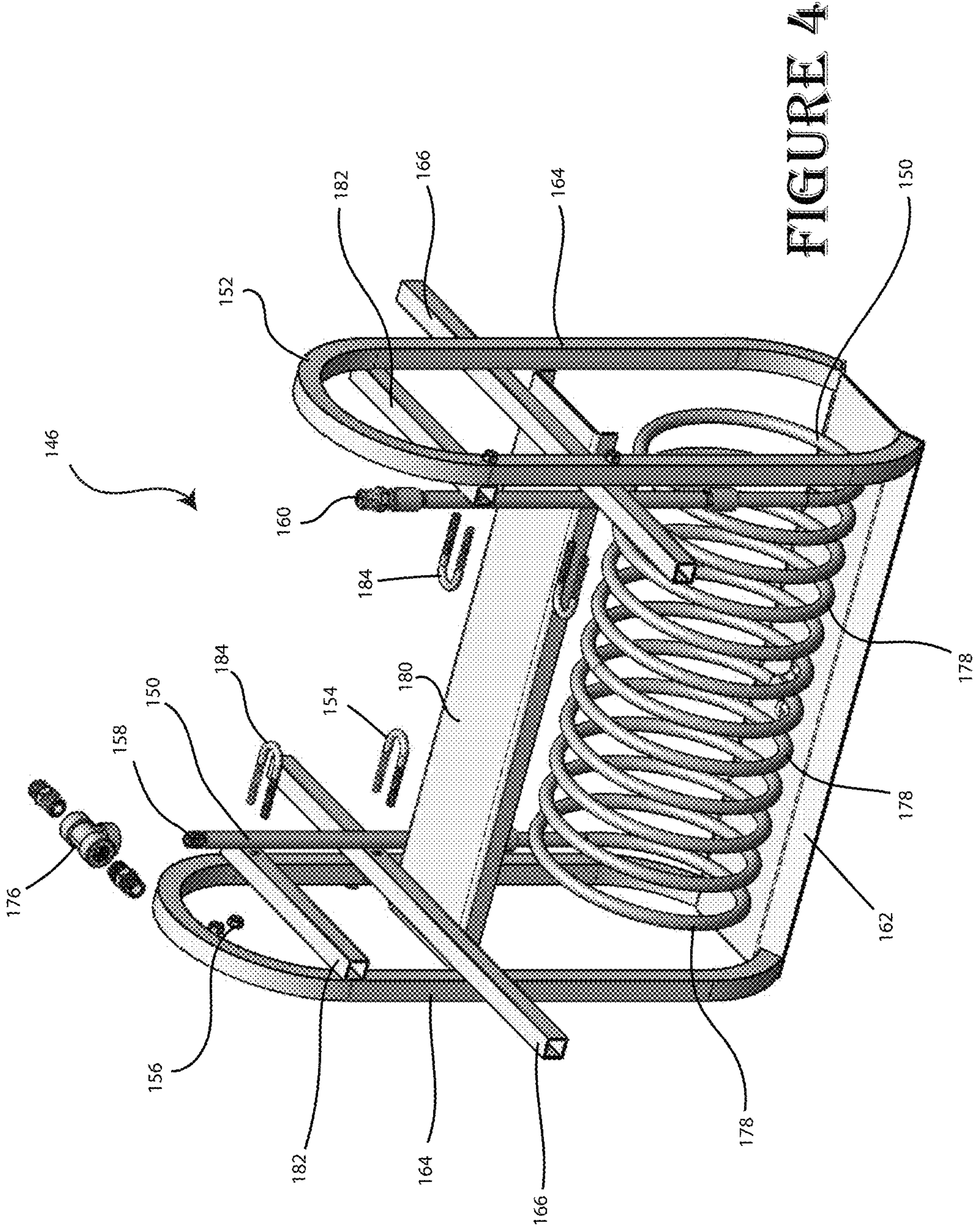
FIG. 4 is a perspective view of a second implementation of a portable liquid fuel vaporizer.
Figure 5:
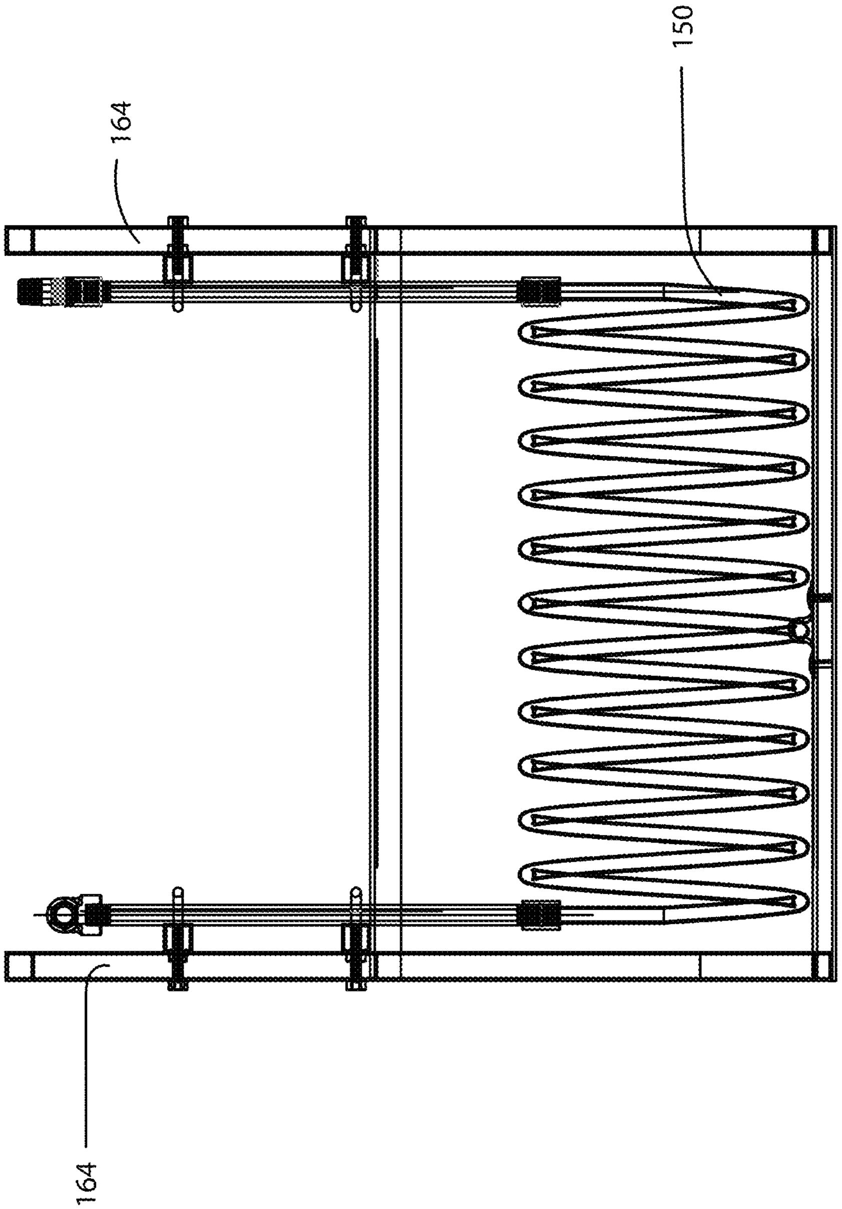
FIG. 5 is a right-side view of the vaporizer shown in FIG. 4.
Figure 6:
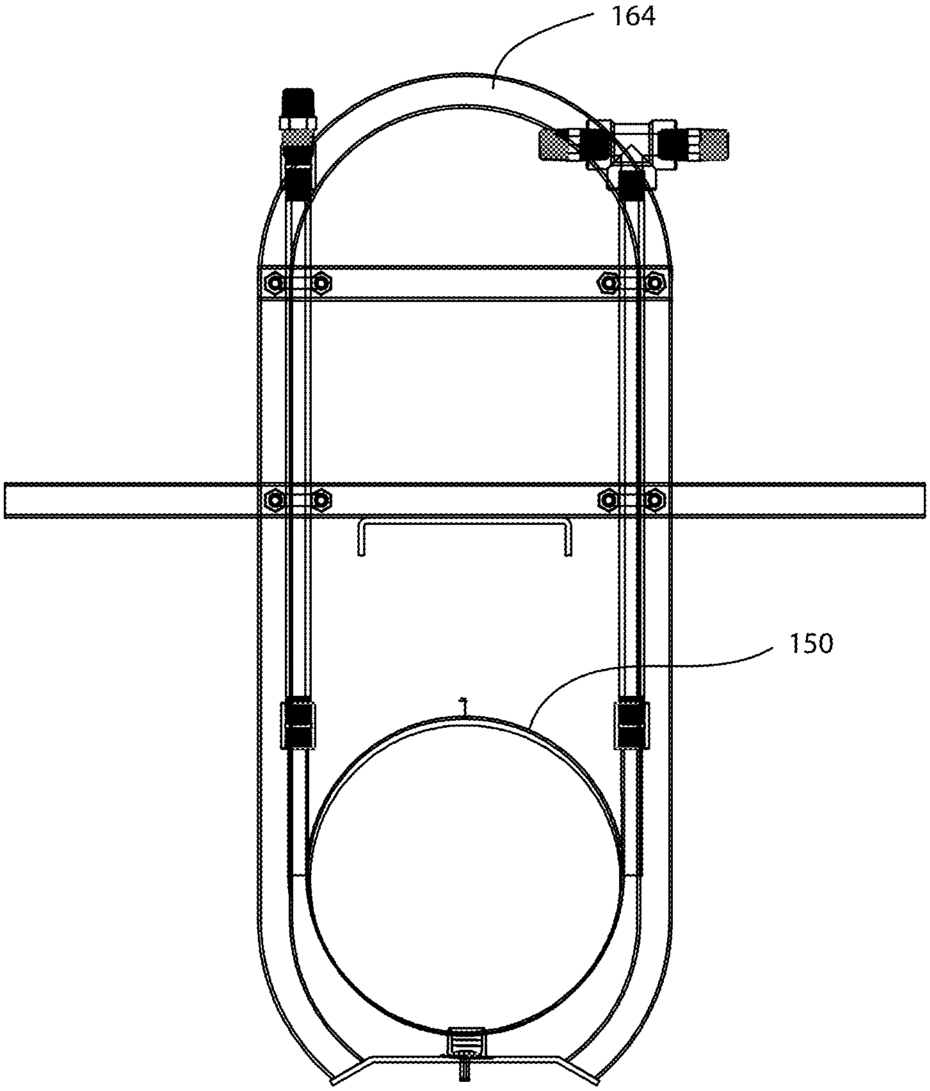
FIG. 6 is an end view of the vaporizer shown in FIG. 4.

FIGS. 4-7 show a second implementation of a liquid fuel vaporizer. With reference to FIG. 4, vaporizer 146 includes a heating coil 150 having a first end 158 adapted to receive a fitting 176. Fitting 176 is shown as a T-fitting but it is contemplated that different fittings could be used. Fitting 176 is used to connect multiple tools such as utility torch 4 to the heating coil 150. Heating coil 150 further includes several spirals 178 between first end 158 and a second end 160. Second end 160 is adapted to be connected to hose 3 to receive a liquid-phase fuel from tank 26. As was heating tube 24 described above, heating coil 150 is a thin-walled metallic tube which efficiently allows the heat from the surrounding air or a heated liquid that will be described in more detail below, to pass therethrough into the liquid-phase fuel passing within the heating coil 150. Metals such as steel and aluminum are suitable, but others are contemplated.

To maintain heating coil 150 in a desired position, heating coil 150 is fixed to a frame 152 using several U-shaped bolts 154 and nuts 156. Frame 152 has a flat bottom plate 162 and two vertically extending end portions 164. To further rigidify frame 152, a support plate 180 connects to two cross members 166 each connected to one of the frame ends 164. U-bolts 154 are connected to cross members 166 to connect the heating coil 150 to the fame 152. A second set of U-bolts 184 connect the heating coil 150 to the frame 152 via a second set of cross members 182.

It is contemplated that vaporizer 146 could be used with or without a heating source. When the ambient temperature is above a certain temperature, liquid-phase fuel which enters the heating coil 150 via the second end 160 will be heated enough to vaporize into a gas before it exits the first end 158 to be used by the tool such a utility torch 4.

When the ambient temperature is below the point that the liquid-phase fuel does not vaporize before reaching the first end 158 of the heating coil 150, the heating coil 150 must be heated with an external heat source.

Figure 7:
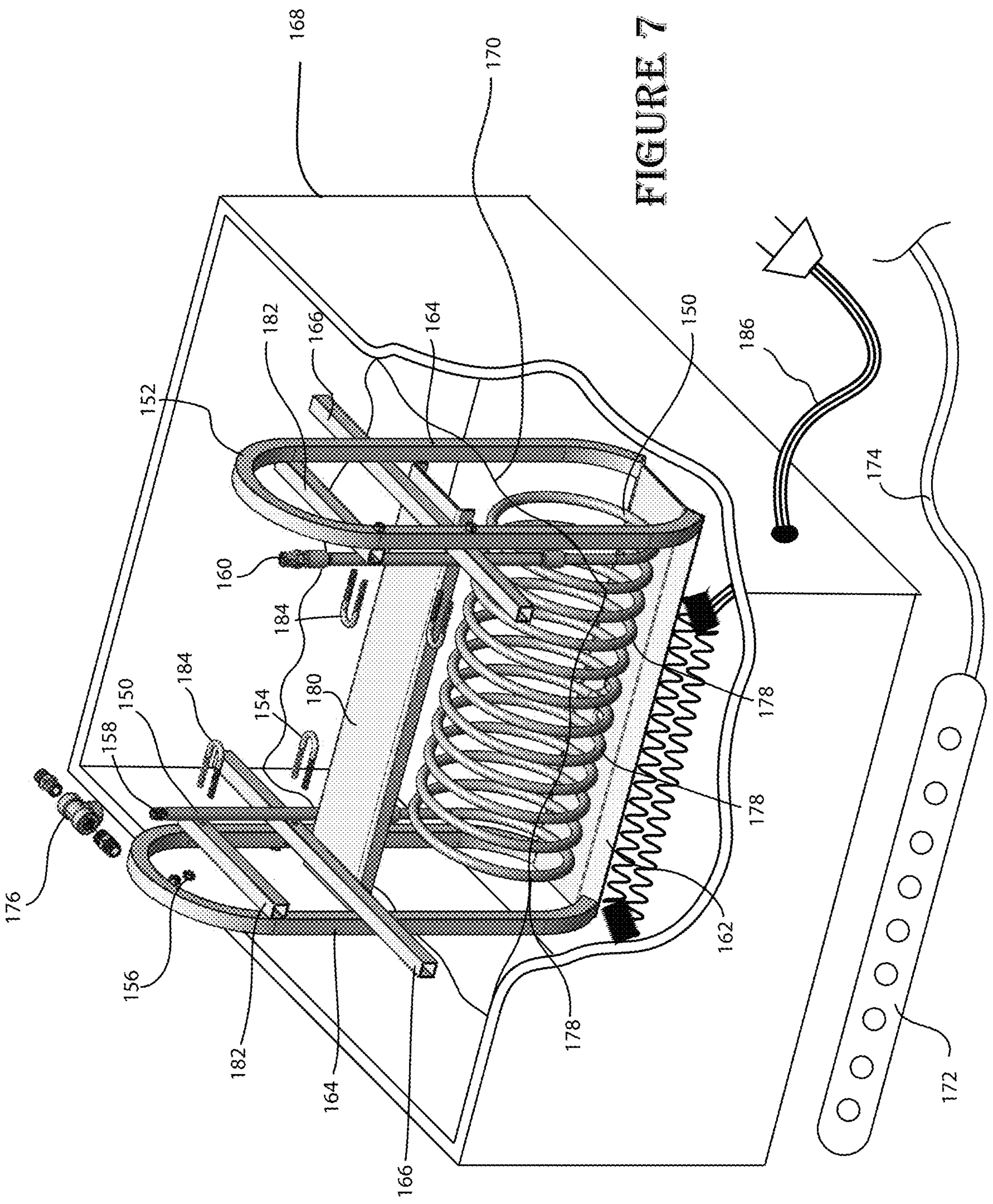
FIG. 7 is a perspective view of the second implementation of FIG. 4 placed within a reservoir.

FIG. 7 shows vaporizer 146 within a reservoir 168 filled with a liquid 170 such as water or a water-glycol mixture. It is contemplated that reservoir 168 be constructed of a metal such as aluminum or steel. The liquid 170 will be heated with a burner 172 connected to a fuel such a propane or via an electric heating element 186.

It is contemplated that vaporizer 146 without reservoir 168 and liquid 170 could be used during periods of hot ambient temperatures such as during the summer months. This will avoid the cost of using a heating means such electric heating element 56/58 and avoid the inconvenience of transporting and installation of the reservoir 168 and liquid 170. But once the ambient temperature falls below the point where the liquid-phase fuel will no longer vaporize without additional heat, the user can place the vaporizer 146 into the reservoir 168 with the liquid 170 and heat the liquid 170. And then once again if the ambient temperature or conditions are such that an external flame or heating element is not adequate to vaporize the liquid-phase fuel using vaporizer 146, the user could convert to using vaporizer 2 as described above.

Figure 8:
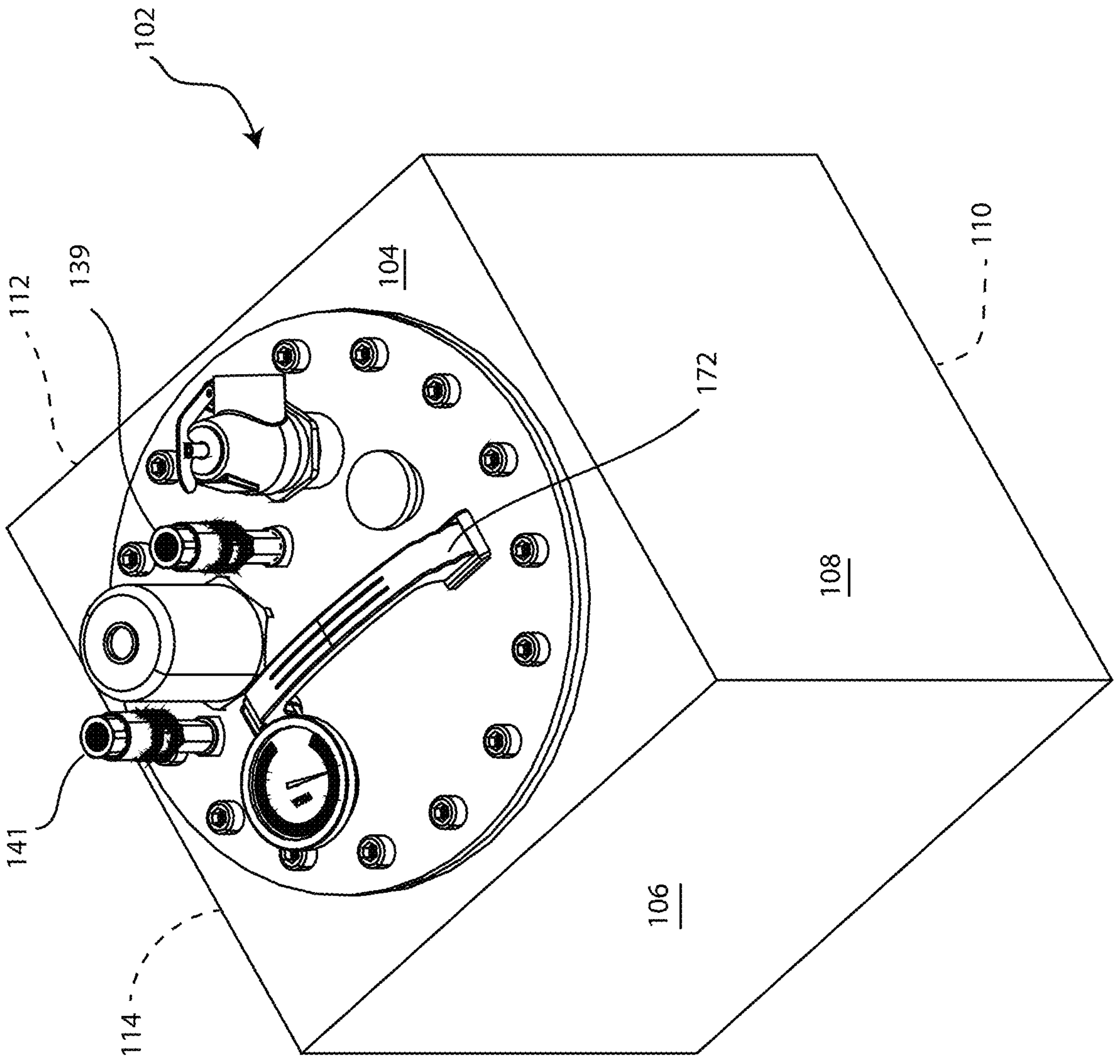
FIG. 8 is a perspective view of a third implementation of a portable liquid fuel vaporizer.

A third implementation of a vaporizer is shown in FIG. 8. Vaporizer 102 is shown having 6 sides 104, 106, 108, 110, 112 and 114. Other than its external shape, it is contemplated that vaporizer 102 is similar to vaporizer 2 and thus will be described in conjunction with those details. Quick connectors 139 and 141 for hoses 3 and 6 extend from side 104. Handle 172 is also placed on side 104 such that when vaporizer 102 is being carried, quick connectors 139 and 141 and their respective hoses are not between the vaporizer 102 and the user such as to not hinder the displacement of the user while carrying the vaporizer.

As best seen in FIG. 8, vaporizer 102 includes at least one side free of connectors or other protruding elements which would be placed between the vaporizer and the user while carrying the vaporizer. In this third implementation, with the orientation of the handle 172, at least side 106 is free of such protruding elements. It should be understood that vaporizer 102 could be carry in any orientation but some will be less convenient and ergonomic for the person carrying the vaporizer than other orientations.

Modifications and improvements to the above-described implementations of the present may become apparent to those skilled in the art. The foregoing description is intended to be exemplary rather than limiting. The scope of the present is therefore intended to be limited solely by the scope of the appended claims.

What is claimed:

1. A vaporizer for heating a liquid-phase fuel, the vaporizer comprising:

a reservoir having a least one wall for containing a heat-conducting fluid;

a heating tube, the heating tube having an inlet end through which liquid-phase fuel will flow and an outlet end through which gaseous fuel will flow; the heating tube being thin-walled such that the exterior surface of the heating tube is in contact with the heat-conducting fluid and an interior surface of the heating tube is in partial contact with the liquid-phase fuel before being vaporized;

at least one electric heating element within the reservoir, the at least one electric heating element being in contact with the heat-conducting fluid to increase the temperature of the heat-conducting fluid to a predetermined temperature, the predetermined temperature being such that the liquid phase fuel entering the heating tube will at least partially vaporize before exiting the heating tube;

a temperature gauge, the temperature gauge having a first portion in contact with the heat-conducting fluid and a second portion to indicate the temperature of the heat-conducting fluid in contact with the first portion;

a controller, the controller operatively connected to the at least one electric heating element to alter the heat output of the at least one electric heating element;

a first flexible hose;

a pressure regulator; and a one-way valve fluidly, wherein the first flexible hose has a first end fluidly connected to the inlet end of the heating tube and a second end fluidly connected to an outlet of the pressure regulator, the pressure regulator further having an inlet fluidly connected to an outlet of the one way valve which has an inlet connected to a tank containing the pressurized liquid-phase fuel, the one-way valve permitting the liquid-phase fuel to flow in a direction from the tank to the heating tube only.

2. The vaporizer of claim 1, wherein the controller is adjustable to increase or decrease the temperature of the heat-conducting fluid.

3. The vaporizer of claim 2, wherein the controller further comprises a manual selector, the manual selector having a plurality of settings, each setting representing a different temperature for the heat-conducting fluid.

4. The vaporizer of claim 3, wherein the controller further comprises a temperature sensor to sense the temperature of the heat-conducting fluid and the controller controls the at least one electric heating element to at least reduce the temperature of the heat-conducting fluid when the sensed heat-conducting fluid temperature is above that corresponding to the one of the plurality of settings at which the manual selector is set.

5. The vaporizer of claim 3, wherein the controller is fixed to the at least one electric heating element such that the controller is outside the reservoir.

6. The vaporizer of claim 1 further comprising a second flexible hose, the second flexible hose having a first end fluidly connected to the outlet end of the heating tube and a second end fluidly connected to a utility torch.

7. The vaporizer of claim 1, wherein the reservoir includes a plurality of surfaces and at least two of the temperature gauge, the controller, the heating tube inlet and the heating tube outlet pass through the same surface of the plurality of surfaces.

8. The vaporizer of claim 1, wherein the reservoir further includes: an inner wall; an outer wall; and an insulation material between the inner and outer walls.

9. The vaporizer of claim 8, further comprising a security valve fluidly connecting the interior of the reservoir with the atmosphere, the security valve calibrated to open at a predetermined pressure within the reservoir caused by the heating of the heat-conducting fluid.

10. A portable vaporizer for heating a liquid-phase fuel, the portable vaporizer comprising:

a reservoir having a least one wall for containing a heat-conducting fluid;

a handle fixed to the at least one wall for transporting the portable vaporizer;

a heating tube, the heating tube having an inlet end through which the liquid-phase fuel will flow and an outlet end through which gaseous fuel will flow, the heating tube being thin-walled such that the exterior surface of the heating tube is in contact with the heat-conducting fluid and an interior surface of the heating tube is in contact with the liquid-phase fuel before being vaporized;

a first flexible hose fluidly connected to the inlet end of the heating tube;

a first toolless connector fluidly connecting the first flexible hose to the inlet end of the heating tube;

a second flexible hose fluidly connected to the outlet end of the heating tube;

a second toolless connector fluidly connecting the second flexible hose to the second end of the heating tube, the first and second toolless connectors enabling quick connecting/disconnecting between the first and second flexible hoses and the heating tube;

at least one electric heating element within the reservoir, the at least one electric heating element being in contact with the heat-conducting fluid to increase the temperature of the heat-conducting fluid to a predetermined temperature, the predetermined temperature being such that the liquid phase fuel entering the heating tube will at least partially vaporize before exiting the heating tube;

a flexible power cord, the flexible power cord having a first end, a second end and an electric plug, the first end of the flexible power cord being connected to the at least one electric heating element, the second end of the flexible power cord connected to the electric plug such that the electric plug can be selectively and toolessly connected to a portable power source;

wherein the first and second toolless connectors and the plug renders the portable vaporizer transportable without the power source and the liquid-phased fuel.

11. The portable vaporizer of claim 10, further comprising a flange connected to the reservoir, the flange having a first aperture and second aperture passing therethrough, the first and second ends of the heating tube fluidly connected to the flange such that the liquid-phase fuel passes through the first aperture of the flange into the reservoir and the vaporized liquid-phased fuel through the second aperture to exit the reservoir, the first and second toolless connectors being connected to the first and second apertures respectively.

12. The portable vaporizer of claim 10, further comprising at least one flat surface upon which the portable vaporizer can be placed for use, the handle being connected to a second surface which is opposite the at least one flat surface such that the handle can be used to vertically lower the portable vaporizer to be placed upon the at least one flat surface after being transported.

13. The portable vaporizer of claim 12, further comprising a third surface between the at least one flat surface and the second surface, the third surface being free of any of the toolless connectors so to not make contact with the user while carrying the portable vaporizer.

14. The portable vaporizer of claim 13, further comprising:

a temperature sensor, the temperature sensor being in contact with the heat-conducting fluid;

a temperature gauge, the temperature gauge indicating the temperature of the heat-conducting fluid measured by the temperature sensor; and a controller, the controller operatively connected to the at least one electric heating element and further comprising a manual selector having a plurality of settings each representing a different temperature for the heat-conducting fluid, the temperature of the heat conducting fluid being controlled via the controller to correspond to the temperature of the selected plurality of settings.

15. The portable vaporizer of claim 14, wherein when the temperature sensed by the temperature sensor corresponds to the temperature set by the manual selector, the controller controls the at least one electric heating element to at least reduce the temperature of the heat-conducting fluid.

16. The portable vaporizer of claim 10, further comprising a utility torch fluidly connected to the second flexible hose, the utility torch producing a flame from the vaporized liquid-phase fuel to apply heat to a surface.

* * * * *